(12) United States Patent
Boshier et al.

(10) Patent No.: US 7,040,812 B2
(45) Date of Patent: May 9, 2006

(54) BEARING ASSEMBLY AND METHOD OF MANUFACTURING A BEARING ASSEMBLY

(75) Inventors: Clive H. Boshier, Lincoln (GB); Allen Christopher Clarke, Lincoln (GB); Paul R. Smith, Lincoln (GB)

(73) Assignee: Minebea Co., Ltd, (JP)

( * ) Notice: Subject to any disclaimer, the term of this patent is extended or adjusted under 35 U.S.C. 154(b) by 57 days.

(21) Appl. No.: 10/490,966

(22) PCT Filed: Sep. 12, 2002

(86) PCT No.: PCT/GB02/04165

§ 371 (c)(1),
(2), (4) Date: Aug. 5, 2004

(87) PCT Pub. No.: WO03/031836

PCT Pub. Date: Apr. 17, 2003

(65) Prior Publication Data

US 2004/0247214 A1 Dec. 9, 2004

(30) Foreign Application Priority Data

Oct. 5, 2001 (GB) .................................. 0123989.6

(51) Int. Cl.
*F16C 11/06* (2006.01)

(52) U.S. Cl. .................................. 384/192; 29/898.046
(58) Field of Classification Search ..............................
29/898.043–898.047; 403/132, 133, 135, 403/140; 384/192, 206, 208
See application file for complete search history.

(56) References Cited

U.S. PATENT DOCUMENTS

| 3,049,940 | A | * | 8/1962 | Neff ............................ 74/569 |
| 3,256,834 | A | * | 6/1966 | Budzich ..................... 74/22 R |
| 5,509,748 | A | * | 4/1996 | Idosako et al. ............. 403/133 |
| 5,813,789 | A | * | 9/1998 | Prickler et al. ............. 403/135 |
| 6,102,408 | A | * | 8/2000 | Anderton et al. ........... 277/370 |
| 6,213,675 | B1 | * | 4/2001 | Ungruh et al. .............. 403/135 |

FOREIGN PATENT DOCUMENTS

| FR | 2436278 | * | 4/1980 |
| GB | 516591 | * | 1/1940 |
| GB | 1291905 | * | 10/1972 |
| GB | 2252595 | * | 8/1992 |
| JP | 2000-24731 | | 1/2000 |
| JP | 2001227455 | | 8/2001 |

OTHER PUBLICATIONS

English translation of Office Action In Japan; Nov. 1, 2005 regarding a Japanese Counterpart application and applying documents of record in the present application; 3 pages.
Eng. language abstract (2 pages) of JP 2000-024731 cited on p. 1 of this Information Disclosure Statement.
Eng. language abstract (2 pages) of JP 2001-227455 cited on p. 1 of this Information Disclosure Statement.

* cited by examiner

*Primary Examiner*—Thomas R. Hannon
(74) *Attorney, Agent, or Firm*—Ipsolon LLP

(57) ABSTRACT

A bearing assembly and method of manufacturing a bearing assembly exposable to transmission fluid, the method comprising the steps of: providing a bearing housing (2) having: a base; an annular wall (11) upstanding from the base having an inner (6) and an outer surface; and a flange (10) extending from the base; providing a ball (3) at one end of a stem (4); forming a hemi-spherical cup in the base of the bearing housing encircled by the annular wall, the cup having an inner surface; seating the ball in the cup; and swaging the annular wall onto the ball.

22 Claims, 3 Drawing Sheets

BEARING ASSEMBLY AND METHOD OF MANUFACTURING A BEARING ASSEMBLY

This invention relates to a bearing assembly and more particularly to a bearing assembly for use in a transmission unit and a method of manufacturing a bearing assembly.

Conventional methods for providing a bearing assembly on the end of a stem for use within a transmission fluid environment have proved unworkable. Taking a conventional bearing and welding the same to the end of the stem would have meant adversely affecting any self-lubricating material present in the bearing assembly so this option had to be discounted. Additionally, a plain spherical bearing utilising a liner system could not be made using conventional methods in a cheap enough manner, so this method was also unavailable.

It is an object of the present invention to seek to overcome the problems associated with conventional methods and designs by providing a bearing assembly and method of manufacturing the same.

Accordingly, one aspect of the present invention provides a method of manufacturing a bearing assembly exposable to transmission fluid, the method comprising the steps of: providing a bearing housing having: a base; an annular wall upstanding from the base having an inner and an outer surface; and a flange extending from the base; providing a ball at one end of a stem; forming an hemi-spherical cup in the base of the bearing housing encircled by the annular wall, the cup having an inner surface; seating the ball in the cup; and swaging the annular wall onto the ball.

Preferably, the bearing housing is cast from a material having a ductility in the region of 10% or greater.

Conveniently, the material is selected from one of the group consisting of: steel, aluminium alloy, magnesium alloy or zinc alloy.

Advantageously, the method comprises the further step of lining the inner surfaces of the cup and the wall with a liner system.

Preferably, the liner system is adhered to the inner surfaces of the cup and the wall.

Conveniently, the liner system is adhered to the inner surfaces of the cup and the wall by Loctite 326.

Preferably, the stem is cylindrical and the ball has a diameter which is greater than that of the stem, the annular wall being swaged onto the ball by a die having a bore sized to receive the stem therethrough and which tapers outwardly toward a lower surface of the die to define a hemi-spherical skirt shaped to swage the annular wall onto the ball.

Advantageously, an outside diameter of the swaged rim of the annular wall is greater than the stem diameter.

Another aspect of the present invention provides a bearing assembly of a transmission unit, the bearing assembly comprising: a bearing housing having: a base; an annular wall upstanding from the base having an inner and an outer surface; a flange extending from the base; an hemi-spherical cup in the base of the bearing housing encircled by the annular wall, the cup having an inner surface; a stem of a first element of the transmission unit and a ball located at one end of the stem, wherein the ball is seated in the cup and the annular wall is swaged onto the ball.

Preferably, a liner system is provided on the inner surfaces of the cup and the wall.

Conveniently, the liner system is produced from a material which is non-hydroscopic and hence does not absorb transmission fluid.

Advantageously, the liner system is a Unimesh liner.

Preferably, the liner system is a self-lubricating liner system.

Conveniently, the bearing housing is a cast part.

Advantageously, the stem and ball are formed integrally with one another.

Preferably, the bearing housing is connected to a second element of the transmission unit.

In order that the present invention may be more readily understood, embodiments thereof will now be described, by way of example, with reference to the accompanying drawings, in which.

Figure 1:
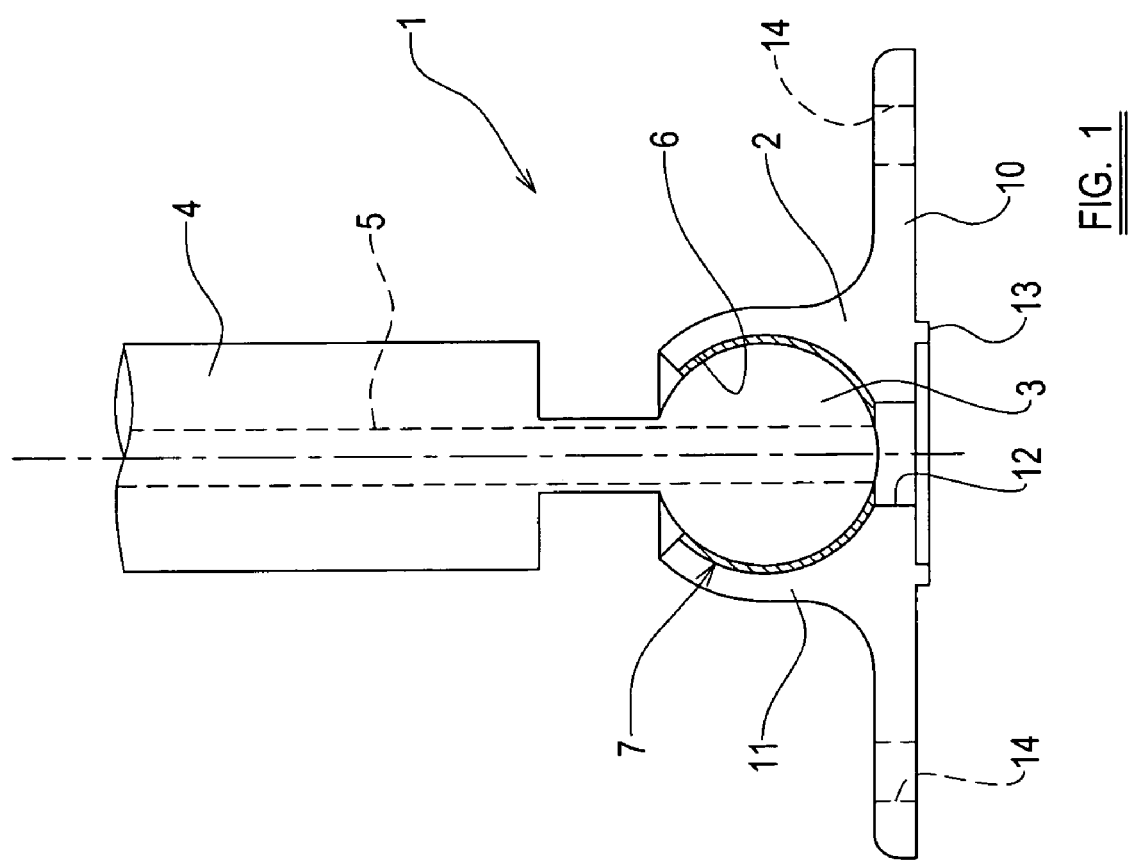
FIG. 1 is a partial cross-section through a bearing assembly embodying the present invention, pre-assembly.

A bearing assembly 1 embodying the present invention for use within a transmission unit is shown in FIG. 1. The bearing assembly 1 comprises a bearing housing 2 comprising one part of a ball joint, the other part of the ball joint comprising a ball 3 which is integrally formed with a stem 4. The stem 4 is a cylindrical shaft which is attached to or forms part of an element (not shown) of the transmission unit within which the bearing assembly is located. The bearing housing 2 is attached to or forms part of a further element (not shown) of the transmission unit within which the bearing assembly is located.

Figure 2:
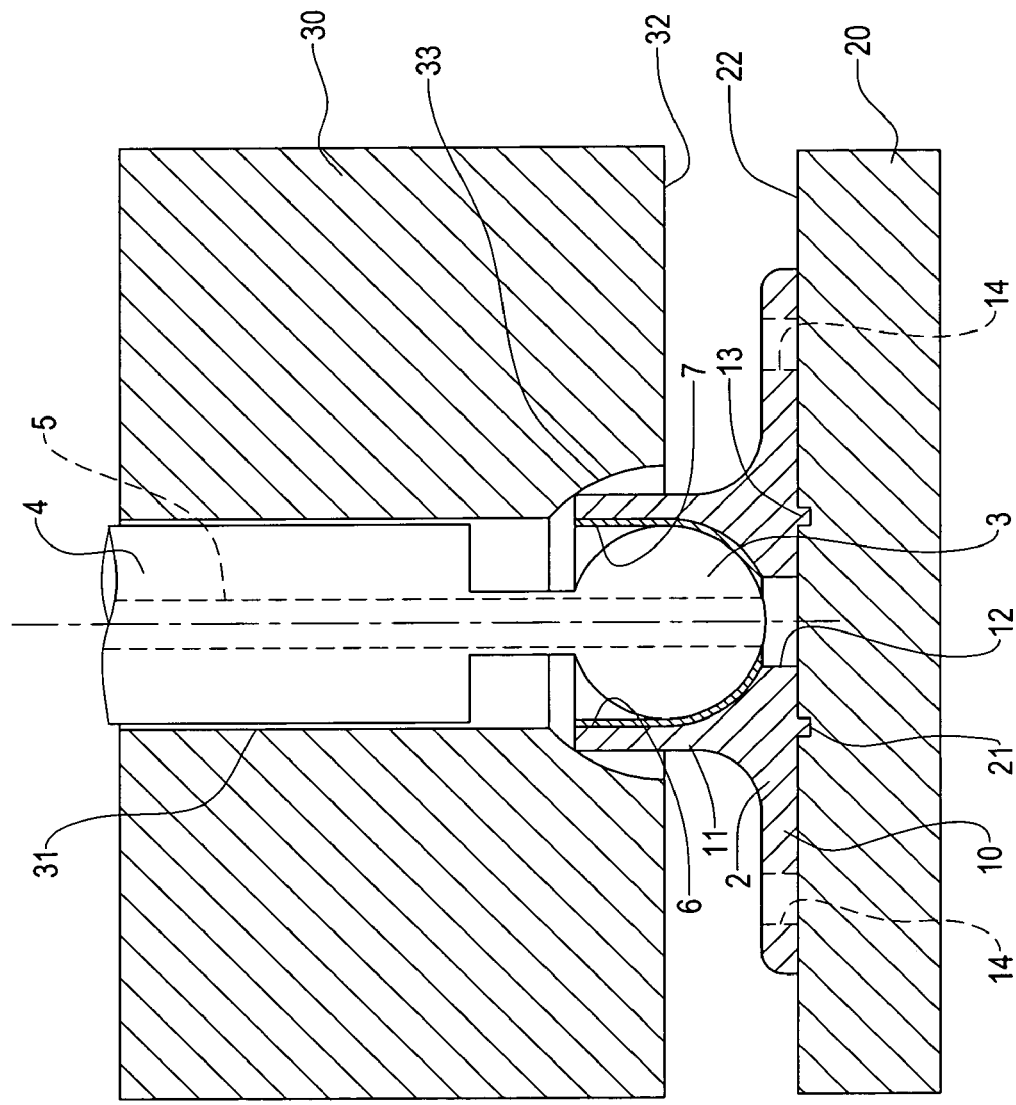
FIG. 2 is a partial cross section of the bearing assembly of FIG. 1 held in an upper and lower die used in a method of manufacturing the bearing assembly embodying the present invention.

Preferably, the stem 4 and ball 3 are integrally formed as shown in FIG. 2. The stem 4 and ball 3 are preferably manufactured from steel and are chrome-plated. A fluid feed bore 5 passes through the stem 4 and the ball 3 allowing transmission fluid to flow from a reservoir (not shown) through the bearing assembly.

The bearing housing 2 is preferably a cast part manufactured from an aluminium, magnesium or zinc alloy or a steel. For reasons which will be discussed below, the ductility of the material from which the bearing housing 2 is manufactured should be suitable for swaging, preferably having a ductility of in the region of 10% or greater.

The bearing housing 2 has an inner spherical contact surface 6 for receiving the ball 3. This contact surface is provided with a liner 7 which is shown schematically and best seen in FIG. 2. The liner 7 is preferably a self-lubricating liner such as UNIMESH (trade mark of Minebea Co. Ltd.) liner.

The bearing housing 2 is provided as a cast part and consists in pre-assembly form, as shown in FIG. 2, of a substantially rectangular flange 10 with an upstanding annular wall 11 the interior of which is machined into a hemi-spherical cup sized to receive the ball 3. A UNIMESH liner 7 is cut to an exact strip shape. The strip is then placed in a die and preformed to give a nominal spherical shape to allow the ball to seat correctly in the cup, with no overlap of the liner or gaps between liner strips. An adhesive of an appropriate viscosity is applied to the inner surface of the bearing housing which is then spun to allow automated application of the adhesive at a desired thickness over the inner surface of the bearing housing. The preformed liner 7 is then adhered to the inner surface 6 of the annular wall 11. A fluid feed bore 12 is provided at the bottom of the spherical cup and a concentric annular projection 13 is formed on the base of the bearing housing 2 to ensure proper registration with the further element of the transmission unit to which the bearing housing is to be mounted.

The site of the ball joint within the transmission unit means that the ball joint will come into contact with transmission fluid. It is, therefore, extremely beneficial if the liner 7 for the ball joint is non-hydroscopic exhibiting no absorption properties so as not to take up any of the transmission fluid thereby not altering the torque characteristics of the bearing assembly. Thus, the ball joint is self-lubricating.

It has been found that adhesive can be used to secure the liner 7 to the contact surface 6 of the bearing housing 2 which has not previously been used with self-lubricating bearings. Loctite 326 (registered trademark Loctite Corporation) is, surprisingly, particularly well suited for this purpose. The use of adhesive for applying the liner to the bearing housing is entirely suited to automated assembly and can readily withstand the high temperatures which may be present in the transmission fluid—in the region of 120° C.

The ball joint readily offers movement between the stem 4 and the bearing housing 2 in the region of 18° from the central axis of the stem 4, which movement is constrained by contact between the stem 4 and the upper rim of the annular wall 11. This angle may be increased although compromises must be made in the load bearing capability of the bearing by reducing the housing width—i.e. the amount by which the upstanding wall 11 wraps around the ball 3.

Even from the schematic representation shown in FIG. 1, it will be readily appreciated that this embodiment of the invention provides a streamlined design.

In FIG. 1, the ball 3 and stem 4 are shown as an integral piece. It is possible to manufacture the stem 4 separately from the ball and attach the ball 3 to the stem 4 using a threaded bore or other means. However, the integral construction is preferred and advantageous in its own right.

It has been proven that the bearing assembly embodying the present invention can withstand the relatively high fatigue loads experienced in the hostile environment within a transmission unit without showing any signs of wear or gap formation within the bearing arrangement.

The flange 10 of the bearing housing 2 is formed with fixing holes 14 to allow the housing 4 to be attached to the further element of the transmission unit. The base of the flange 10 of the bearing housing 2 is preferably machined and may also be provided with registering pins or an annulus 13 to ensure accurate registration with and connection to the further element of the transmission unit.

The method of manufacture of the bearing assembly is extremely important. Many methods were considered but no conventional methods were practical for providing a bearing assembly on the end of a stem for use within a transmission fluid environment. Taking a conventional bearing and welding the same to the end of the stem would have meant adversely affecting any self-lubricating material making up the ball joint so this option had to be discounted. Additionally, a plain spherical bearing utilising a liner system could not be made using conventional methods in a cheap enough manner, so this method was also discounted. Surprisingly, the step of incorporating the bearing assembly as a part of or attached to the stem 4, solves many problems associated with conventional designs of bearing assemblies within transmission units.

A bearing assembly embodying the present invention is manufactured as follows.

Turning to FIG. 2 of the drawings, as previously described, the stem 4 and ball 3 are provided as an integral machined piece. The bearing housing 2 is held in a lower die 20 and preferably registered therewith using the annual projection 13 in a corresponding annular depression 21 formed in an upper surface 22 of the lower die 20.

Figure 3:
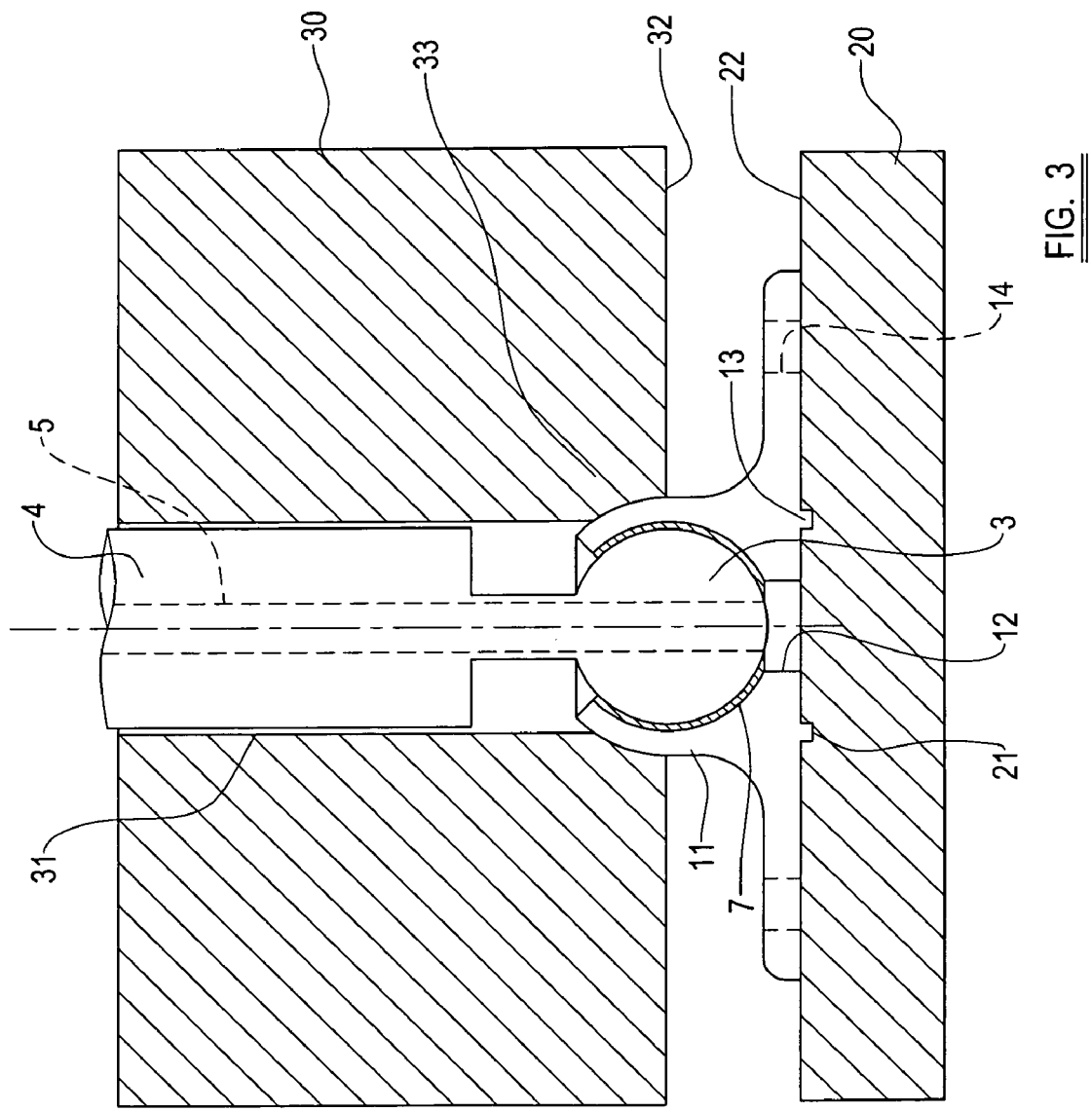
FIG. 3 is a schematic partial cross section of the bearing assembly of FIG. 1, post assembly held in the dies of FIG. 2.

An upper die 30 is substantially cylindrical and is formed with a central cylindrical bore 31 extending therethrough which tapers outwardly toward a lower surface 32 of the die 30 to define a hemi-spherical skirt 33. The cylindrical bore 31 is sized so as to receive the stem 4 therein, almost with a slide-fit engagement, so that the stem 4 passes through the die 30 and the spherical skirt 33 rests upon the top of the annular wall 11 of the bearing housing 2. The dies 20, 30 are held in a jig and a compressive load applied to the dies forcing the upper die 30 down on to the lower die 20 and swaging the upper part of the annular wall 11 down on to the upper half of the ball 3 as shown in FIG. 3 thereby wrapping the annular wall 11 around the ball 3 to provide a load bearing area. The compressive load can be varied to determine the initial torque of the resultant ball joint.

It should be noted that the outside diameter of the rim of the annular wall 11 is greater than the stem diameter. Further and importantly, since the diameter of the cylindrical bore 31 is sized so as to receive the stem 4 therein, almost with a slide-fit engagement, the free rim of the annular wall 11 fully wraps around the ball 3 as the skirt 33 of the upper die 30 can swage the wall 11 fully around the ball 3 to maximise the load bearing area, including the free rim of the annular wall.

By manufacturing the casting of the bearing housing 2 from a material having a ductility of 10% or greater, one obtains a satisfactory swaging of the upper part of the annular wall 11 on to the ball 3 as shown in FIG. 3.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of manufacturing a bearing assembly exposable to transmission fluid, the method comprising the steps of:
   providing a bearing housing having: a base; an annular wall upstanding from the base having an inner and an outer surface; and a flange extending from the base;
   providing a ball at one end of a stem;
   forming an hemi-spherical cup in the base of the bearing housing encircled by the annular wall, the cup having an inner surface; adhering a preformed liner to the inner surfaces of the cup and the wall, said liner being produced from a material which is non-hydroscopic and so does not absorb transmission fluid;
   seating the ball in the cup; and
   swaging the annular wall onto the ball.

2. A method according to claim 1, wherein the bearing housing is cast from a material having a ductility in the region of 10% or greater.

3. A method according to claim 2, wherein the liner is adhered to the inner surfaces of the cup and the wall by an adhesive.

4. A method according to claim 2, wherein the stem is cylindrical and the ball has a diameter which is greater than that of the stem, the annular wall being swaged onto the ball by a die having a bore sized to receive the stem therethrough and which tapers outwardly toward a lower surface of the die to define a hemi-spherical skirt shaped to swage the annular wall onto the ball.

5. A method according to claim 2, wherein the bearing housing material is selected from one of the group consisting of: steel, aluminium alloy, magnesium alloy or zinc alloy.

6. A method according to claim 5, wherein the stem is cylindrical and the ball has a diameter which is greater than that of the stem, the annular wall being swaged onto the ball by a die having a bore sized to receive the stem therethrough and which tapers outwardly toward a lower surface of the die to define a hemi-spherical skirt shaped to swage the annular wall onto the ball.

7. A method according to claim 5, wherein the liner is adhered to the inner surfaces of the cup and the wall by an adhesive.

8. A method according to claim 1, wherein the liner is adhered to the inner surfaces of the cup and the wall by an adhesive.

9. A method according to claim 8, wherein the stem is cylindrical and the ball has a diameter which is greater than that of the stem, the annular wall being swaged onto the ball by a die having a bore sized to receive the stem therethrough and which tapers outwardly toward a lower surface of the die to define a hemi-spherical skirt shaped to swage the annular wall onto the ball.

10. A method according to claim 1, wherein the stem is cylindrical and the ball has a diameter which is greater than that of the stem, the annular wall being swaged onto the ball by a die having a bore sized to receive the stem therethrough and which tapers outwardly toward a lower surface of the die to define a hemi-spherical skirt shaped to swage the annular wall onto the ball.

11. A method according to claim 10, wherein an outside diameter of the swaged rim of the annular wall is greater than the stem diameter.

12. A bearing assembly of a transmission unit, the bearing assembly comprising:

a bearing housing having: a base; an annular wall upstanding from the base having an inner and an outer surface; a flange extending from the base; an hemi-spherical cup in the base of the bearing housing encircled by the annular wall, the cup having an inner surface; a preformed liner adhered to the inner surfaces of the cup and the wall, said liner being produced from a material which is non-hydroscopic and hence does not absorb transmission fluid;

a stem of a first element of the transmission unit and a ball located at one end of the stem, wherein the ball is seated in the cup and the annular wall is swaged onto the ball.

13. A bearing assembly according to claim 12, wherein the liner is a self-lubricating liner.

14. A bearing assembly according to claim 13, wherein the bearing housing is a cast part.

15. A bearing assembly according to claim 13, wherein the stem and ball are formed integrally with one another.

16. A bearing assembly according to claim 13, wherein the bearing housing is connected to a second element of the transmission unit.

17. A bearing assembly according to claim 12, wherein the bearing housing is a cast part.

18. A bearing assembly according to claim 17, wherein the stem and ball are formed integrally with one another.

19. A bearing assembly according to claim 17, wherein the bearing housing is connected to a second element of the transmission unit.

20. A bearing assembly according to claim 12, wherein the stem and ball are formed integrally with one another.

21. A bearing assembly according to claim 20, wherein the bearing housing is connected to a second element of the transmission unit.

22. A bearing assembly according to claim 12, wherein the bearing housing is connected to a second element of the transmission unit.

* * * * *